(12) United States Patent
Freudelsperger

(10) Patent No.: US 8,666,536 B2
(45) Date of Patent: Mar. 4, 2014

(54) PROCESS AND DEVICE FOR MANUALLY COMMISSIONING INDIVIDUALLY PACKAGED PRODUCTS WITH A FLOW SHELF

(75) Inventor: Karl Freudelsperger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 448 days.

(21) Appl. No.: 13/058,772

(22) PCT Filed: Jul. 17, 2009

(86) PCT No.: PCT/EP2009/005229
§ 371 (c)(1),
(2), (4) Date: Feb. 11, 2011

(87) PCT Pub. No.: WO2010/017873
PCT Pub. Date: Feb. 18, 2010

(65) Prior Publication Data
US 2011/0142581 A1    Jun. 16, 2011

(30) Foreign Application Priority Data
Aug. 14, 2008  (DE) .......................... 10 2008 037 657

(51) Int. Cl.
*G06F 7/00*  (2006.01)
(52) U.S. Cl.
USPC ......................................... 700/226; 700/214
(58) Field of Classification Search
USPC .................................................. 700/214, 226
See application file for complete search history.

(56) References Cited

U.S. PATENT DOCUMENTS

| | | | |
|---|---|---|---|
| 5,734,574 A * | 3/1998 | Yamashita et al. ............ | 700/215 |
| 5,757,650 A * | 5/1998 | Yamashita et al. ............ | 700/214 |
| 2008/0269960 A1 | 10/2008 | Kostmann et al. | |

FOREIGN PATENT DOCUMENTS

| AT | 403 156 B | 11/1997 |
|---|---|---|
| DE | 89 07 478 U1 | 8/1989 |
| EP | 0 847 939 A1 | 6/1998 |
| WO | WO 2005118436 A1 | 12/2005 |

* cited by examiner

*Primary Examiner* — Ramya Burgess
(74) *Attorney, Agent, or Firm* — McGlew and Tuttle, P.C.

(57) ABSTRACT

A method and an apparatus for manual order picking of items in an order-picking installation with a dynamic-storage rack (1) as a store for the manual order picking. It is proposed that the items are automatically transported, preferably separately according to type, in containers or boxes (2) to the dynamic-storage rack/flow shelf (1) on a driven conveying line (4). After reading and identifying the containers (2), they are automatically introduced by an activated stationary lift (5) and activated level conveyor unit (6) of the dynamic-storage rack (1) into selected dynamic-storage channels (3) of the dynamic-storage rack. The channels have exits (A) that can be manually reached by an order picker (17). Items are fed by an order picker (17) at the picker's order-picking station in an order-related manner from a container/box (2) at a selected exit (A) of a dynamic-storage channel (3) to a provided order container (30).

30 Claims, 6 Drawing Sheets

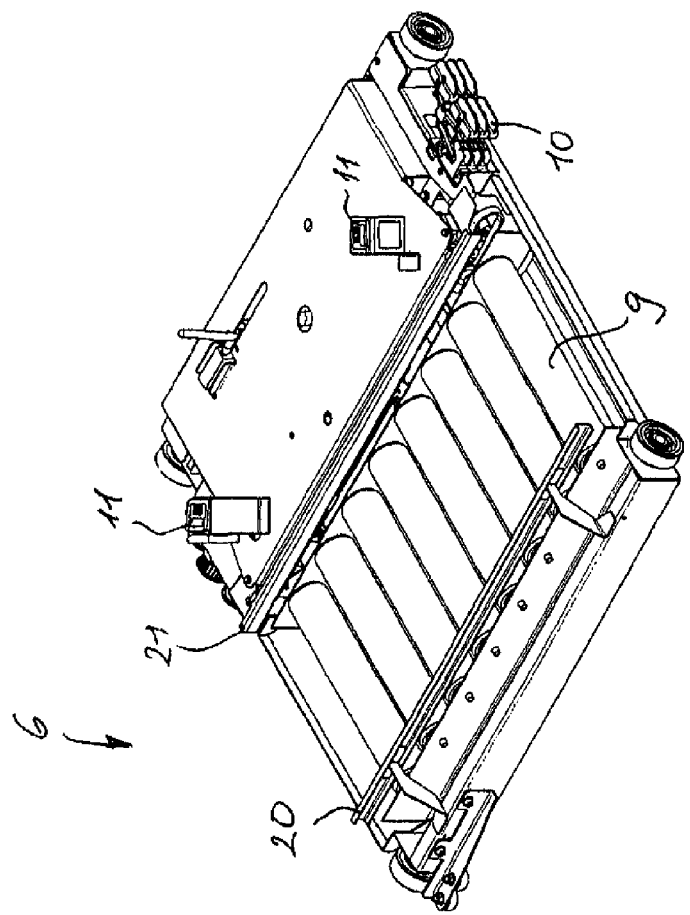
Fig. 6
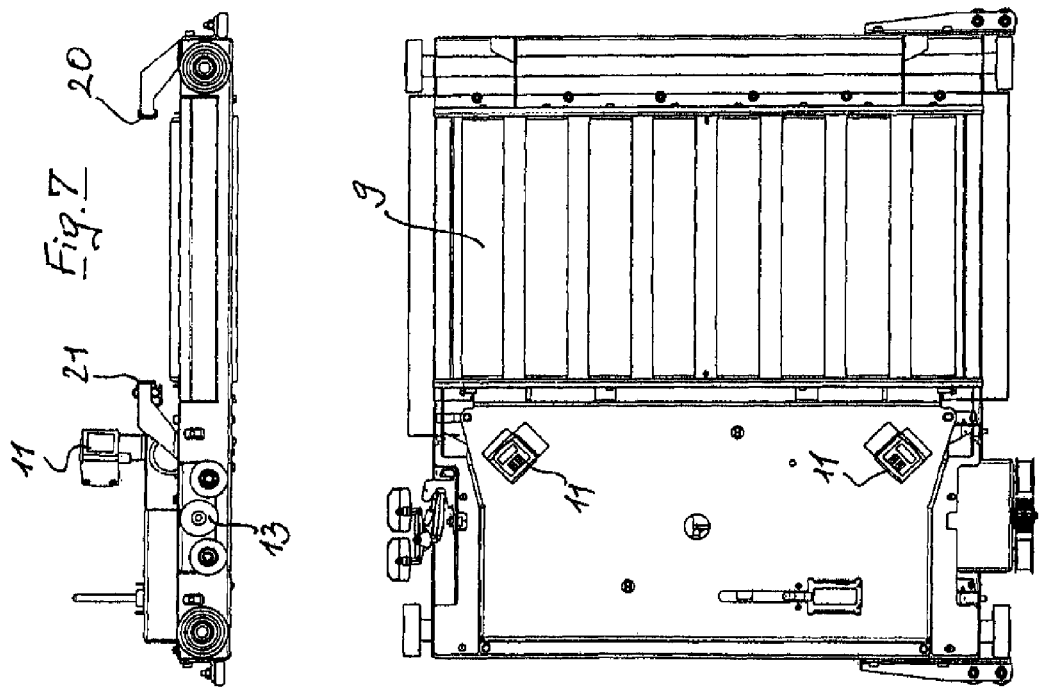
Fig. 7
Fig. 8

PROCESS AND DEVICE FOR MANUALLY COMMISSIONING INDIVIDUALLY PACKAGED PRODUCTS WITH A FLOW SHELF

CROSS REFERENCE TO RELATED APPLICATIONS

This application is a United States National Phase application of International Application PCT/EP2009/005229 filed Jul. 17, 2009 and claims the benefit of priority under 35 U.S.C. §119 of German Patent Application DE 10 2008 037 657.4 filed Aug. 14, 2008, the entire contents of which are incorporated herein by reference.

FIELD OF THE INVENTION

The present invention pertains to a process and a device for manually commissioning individually packaged products in a commissioning unit with a flow shelf as a reserve for manual commissioning.

BACKGROUND OF THE INVENTION

Storing products to be commissioned manually as a reserve in static bays is state of the art.

Flow shelves are used if it is necessary to store and refill larger quantities of products. The products are filled in original containers or cardboard boxes into the rear side of the flow shelf. The cardboard boxes are opened on the front side when needed and individual products are taken for manual commissioning.

There also are solutions in which the filling of the throughput channels is carried out by a two-dimensionally movable bay storage and retrieval unit, which is guided on rails and is longitudinally displaceable and at the same time adjustable in height in order to introduce products into a bay. The products are introduced here first on a parking space in the bay storage and retrieval unit and pushed into the flow shelf as needed.

The solution with a bay storage and retrieval unit for automatic filling has a number of drawbacks:

The possibility of retrofitting is almost always nonexistent because the buildings are too low in the area of the automatic units, and the ceilings have a load-bearing capacity that is too low for a high bay.

The throughput of a bay storage and retrieval unit is in many cases insufficient to transfer the desired quantity of products from parking spaces into the throughput channels.

Solutions with bay storage and retrieval units have to rely on the storage of a standard container. At least the width must be equal (e.g., 1 cardboard box of 600×400 or two cardboard boxes of 300×400).

All products in the flow shelves must be first introduced into the bay.

The energy consumption and electric connected loads of a bay storage and retrieval unit are so high that the electric supply lines are often insufficient.

SUMMARY OF THE INVENTION

Based on the above-described state of the art, the object of the present invention is to improve a process and a device for refilling a flow shelf of the class mentioned in the introduction such that while having a simple design, the flow shelf can be filled rapidly and effectively and reliably with containers containing individually packaged products and the individually packaged products can be commissioned ergonomically and effectively.

The essence of the present invention is that the individually packaged products are transported automatically in containers to the flow shelf, preferably such that they are all of the same kind, and after reading and recognition, they are automatically introduced into selected throughput channels of the flow shelf with outlets that can be reached by a human operator by hand via an activated stationary elevator and activated level control units of the flow shelf. The individually packaged product is fed according to the order, to an order container made available, from a container at a selected outlet of a throughput channel by the commissioning person at his commissioning workplace.

Besides filling the throughput channels in such a way that the products are all of the same kind, mixed filling is also advantageous for very slowly moving products.

In particular, for putting together a commissioning order, the individually packaged products, removed manually by one or more commissioning persons from a container, are commissioned directly into an order container made available and removed on a pulling-out conveying mechanism under the flow shelf, or commissioned in buffer trays of the flow shelf and stored intermediately before they are thrown onto a central belt arranged under the flow shelf into a fictitious order window and are transferred to the order container only then by conveying on the central belt.

A completely commissioned order container is fed to a shipping station.

Completely emptied containers of the flow shelf can be used as order containers, lifted out of the flow shelf and transferred by the commissioning person into a readiness position near the floor in front of the front of the bay preferably onto a bay front conveying section.

A device according to the present invention for refilling the flow shelf is characterized by at least one driven conveying section preferably in the form of an accumulating roller conveyor and at least one flow shelf with sloped throughput channels in a plurality of bay levels, preferably three or four bay levels, which are arranged above a conveying mechanism pulling off commissioned individually packaged products and whose outlets can be reached by a commissioning person for manually commissioning individually packaged products. The flow shelf has a displaceable, track-guided level control or conveyor unit in each bay level for automatically filling the throughput channels with containers, which contain individually packaged products that are all of the same kind. Furthermore, the flow shelf has at least one stationary elevator connected to the conveying section for automatically transporting the containers from the conveying section into each selected bay level. Finally, the flow shelf comprises a buffer section in each bay level connected to the elevator for automatically taking over the containers from the elevator, whose outlet can be automatically approached by the level control unit, wherein said level control unit can take over one container each for horizontal transportation to the inlet of a selected throughput channel.

The level control or conveyor units are preferably guided in horizontal braces of the flow shelf, which braces are designed as rails.

The flow shelf has mostly only one-sided throughput channels.

The flow shelf may also be designed as a double bay, in which case the level control units are horizontally displaceable in a central bay aisle of the double bay and can be positioned at the outlets of the buffer section and at the inlets of opposite throughput channels.

The level control unit has a load pickup or transfer means with drivable rollers, whose axes extend in the direction of travel of the level control unit and at right angles to the throughput channels.

The load pickup means comprises a stationary lateral railing each at right angles to the direction of travel in the area of the axial ends of the rollers.

The distance between the two lateral railings can preferably be set and corresponds especially to the width of a container, and at least one of the two railings is adjustable as an adjusting means.

The level control unit can be positioned now at the inlets of throughput channels of different widths, the distance between the two railings being set each time to the width of the activated throughput channel.

The conveying section preferably has a recognition means for recognizing a fed container and for transmitting the data of the container to a central computer, which brings about fully automatic operation of feeding the containers along with sorting in the throughput channels.

The level control unit is also equipped with at least one sensor for recognizing the state of filling of a throughput channel.

The conveying section is preferably arranged overhead in order to make possible an unhindered access to the flow shelf and to the automatic commissioning unit.

The conveying section may also have a connection section for at least one adjacent flow shelf.

The flow shelf is composed especially of a plurality of bay modules, which are located one after another in the direction of travel of the level control units.

Consequently, the products are fed to the flow shelf due to the present invention via a stationary elevator, and lightweight, displaceable level control units of a simple design in each bay level. The stationary elevator of a simple design has an adjusting platform preferably for only one container. It was found that the use of an elevator is advantageous even in flow shelves of a small overall height, which are not high bays, and can be reached by a human operator by hand. The possibility of expansion is also advantageous, because the system can grow with the automatic commissioning unit. The existing level control units can equally approach and service the additional bay modules. The throughput channels do not need any control instruments such as sensors or reflectors for checking the filling level, because the control instruments are arranged displaceably and on the level control units that are present anyway.

The present invention offers various advantages over the state of the art described in the introduction:

The area load and space requirement correspond to the existing flow shelves, as a result of which simple retrofitting is possible.

The throughput of the flow shelf according to the present invention with integrated elevator and bay storage and retrieval units in each bay level is approximately four times that in a conventional solution based on bay storage and retrieval unit without elevator and without separate level control units in each bay level. As a result, nearly all requirements on throughput can be met. Products that are too fast for the system according to the present invention are filled, in general, directly from a pallet into the automatic unit.

Due to the fact that the products do not have to be introduced into a bay, but are brought up to the throughput channel on a roller conveyor (the level control unit and elevator represent each a roller conveyor mechanism permitting displacement over a short section), there are no restrictions in terms of geometry as long as the product can be transported on the conveying mechanism.

The energy demand of the system is very low due to the small moving masses of the compact level control units. The electric connected loads equal only about 10% of the values that are necessary for a conventional large, displaceable bay storage and retrieval unit with integrated elevator.

Since the products move to the flow shelf according to the present invention on a conveyor, they may come from any desired site within the warehouse, e.g., directly from receiving, from a manual pallet warehouse or from an automatic high-shelf storage area.

Further advantages are:

The area of the level control units is also walkable in a simple manner even in case of two-sided arrangement of the throughput channels.

Simplicity of design/cost savings.

The number of components is small. The maintenance effort is also low as a result.

Checking to determine whether the throughput channel is full does not have to be arranged per throughput channel any longer, but it is carried along centrally at the level control unit.

The present invention will be described in more detail below on the basis of exemplary embodiments with reference to the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is the level control unit according to FIG. 4 in a perspective view;

FIG. 7 is the level control unit according to FIG. 4 in a side view; and

FIG. 8 is the level control unit according to FIG. 4 in a top view.

DESCRIPTION OF THE PREFERRED EMBODIMENTS

Figure 1:
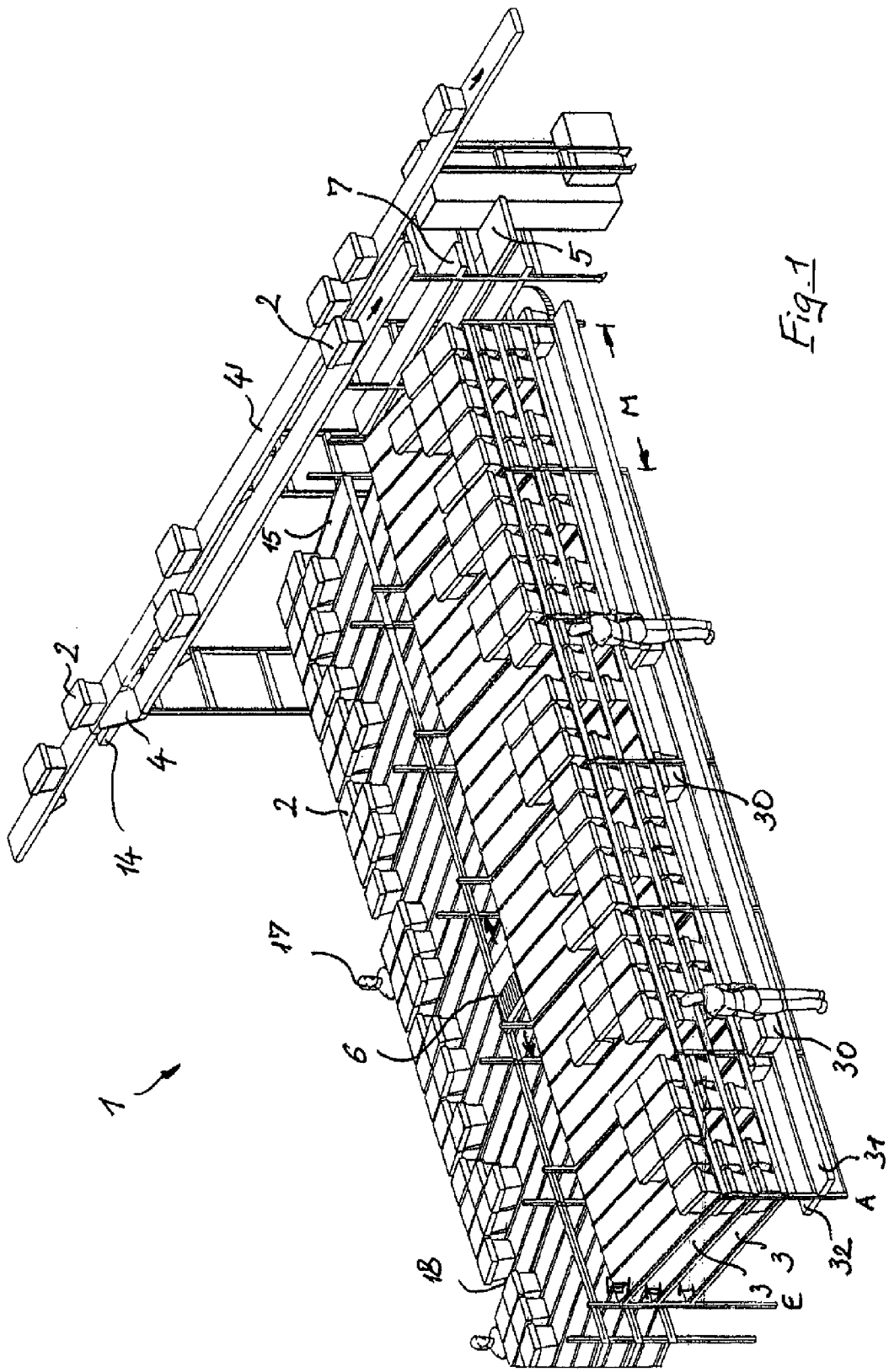
FIG. 1 is a schematic perspective view, as viewed from the rear, of a flow shelf of a commissioning unit along with containing conveying sections and pulling-off conveyor mechanism with bay front conveying section according to a first variant of the present invention.
Figure 2:
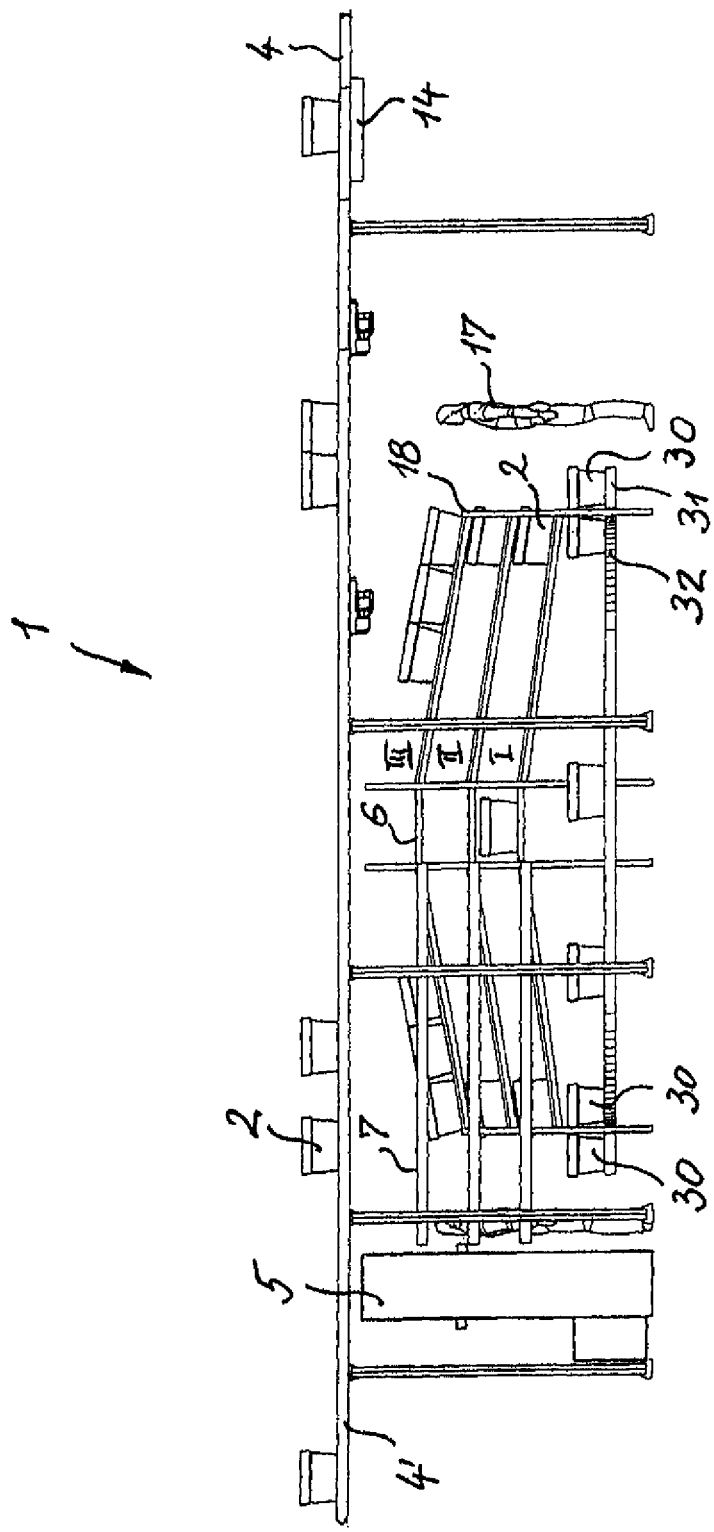
FIG. 2 is a front view of the flow shelf according to FIG. 1, as viewed from the container conveying section.

Referring to the drawings in particular, to put together a commissioning order, the individually packaged products removed manually from a container 2 and are commissioned in a first alternative of the present invention according to FIGS. 1 and 2 by one or more commissioning persons 17 at one or more flow shelves 1 directly in an order container 30 made available and removed on a pulling-off conveying mechanism 32 under the flow shelf 1. In a second alternative of the present invention according to FIG. 3, they are commissioned in buffer trays 33 of the flow shelf 1 and stored intermediately before they are thrown onto a central belt 30 arranged under the flow shelf 1 into a fictitious order window and are transferred to the order container only then by conveying on the central belt.

The individually packaged products are automatically transported to a flow shelf 1 in containers on a driven conveying section 4 such that they are all of the same kind, and after reading and recognition, they are automatically introduced into selected throughput channels 3 of the flow shelf with outlets A that can be reached by a commissioning person 17 manually via an activated stationary elevator 5 and activated level control units 6 of the flow shelf 1.

Mixed filling of the containers 2, in which case the individually packaged products are not consequently introduced such that they are all of the same kind, is advantageous for very slowly moving individually packaged products.

In particular, a driven conveying section 4 in the form of an accumulating roller conveyor as well as a flow shelf 1 with sloped throughput channels 3 in a plurality of bay levels I, II, III, preferably three to four bay levels, whose outlets A can be reached by a commissioning person 17, are provided.

The pulling-off conveyor mechanism 32 is located under the lowermost bay level I.

The flow shelf 1 contains a displaceable, track-guided level control or transfer unit 6 each in each bay level I, II, III for automatically filling the throughput channels 3 with containers 2, which contain individually packaged products that are all of the same kind.

Furthermore, the flow shelf 1 has a stationary elevator 5 connected to the conveying section 4 for the automatic transportation of the containers 2 from the conveying section 4 into each selected bay level I, II, III.

The flow shelf 1 also has a buffer section 7 each in each bay level I, II, III connected to the elevator 5 for taking over the containers 2 automatically from the elevator, whose outlet can be automatically approached by the level control unit 6, wherein said level control unit can take over a container 2 each for horizontal transportation to the inlet E of a selected throughput channel 3.

The level control units 6 are guided by guide rollers in horizontal braces of the flow shelf 1, which said braces are designed as rails 8.

The flow shelf 1 according to FIGS. 1 and 2 is designed as a double bay, and the level control units 6 can be displaced horizontally in the direction of travel F in a central bay aisle R of the double bay and are positioned at the outlets of the buffer section and at the inlets E of opposite throughput channels 3.

The level control unit 6 has a load pickup means with drivable rollers, whose axes extend in the direction of travel F of the level control unit 6 and at right angles to the throughput channels 3, as this can be seen especially in FIGS. 4 through 8.

The load pickup means has a stationary lateral railing 20, 21 each at right angles to the direction of travel F in the area of the axial ends of the rollers 9.

The distance between the two lateral railings 20, 21 can be set, and the distance set corresponds to the width of a container 2. Only the front railing 20, which is located at the edge of the level control unit, is preferably provided as an adjusting means in both embodiment variants. The two lateral railings 20, 21 extend at right angles to the direction of travel F.

The level control unit 6 can be positioned at the inlets E of throughput channels 3 of different widths, the distance between the two railings 20, 21 being set to the width of the activated throughput channel 3.

The level control unit 6 has, furthermore, an electric drive 13, which is connected to a stationary conductor rail preferably via sliding contacts 10.

The electric drive 13 has a shaft encoder, with which the distance traveled by the level control unit 6 can be measured.

The level control unit 6 is equipped with two sensors 11 for recognizing the state of filling of a throughput channel 3.

The conveying section 4 has a recognition means for recognizing a fed container 2 and to transmit the data of the container to a central computer, which brings about a fully automatic operation of feeding the containers along with sorting in the throughput channels 3.

The conveying section 4 is arranged overhead and makes possible a clear passage to the flow shelf.

The conveying section 4 has a connection section 4' for adjacent flow shelves (not shown), and said flow shelves 1 may be able to be provided in a parallel arrangement.

Each flow shelf 1 is composed of a plurality of bay modules M, which are located one after another and in the direction of travel F of the level control units 6.

The throughput channels 2 have two lateral roller strips 19, and adjacent throughput channels 3 are separated from each other by separating webs 12.

Throughput channels for rejects 15, in which damaged or unidentified containers 2 are sorted out and processed further separately, are also provided in the area of the buffer sections.

The level control unit 6 consequently has rollers 9 as load pickup/transfer means. The rollers 9 are driven and can pick up and release a container 2 at right angles to the direction of travel F.

The level control unit 6 travels on running rails 8. The level control unit is driven in the embodiment variant described with a so-called omega drive according to FIG. 7 along a fixed toothed belt, the toothed belt running as in an omega around the drive roller. The motor of the level control unit has a shaft encoder, with which the distance traveled can be measured. The level control unit thus knows its position and can be positioned in front of the desired throughput channel. The drive may, in principle, also be designed as a frictionally engaged drive with wheels. The level control unit is held by guide rollers in a fixed position in relation to the flow shelf, because the rails 8 are part of the flow shelf.

By switching on the rollers, the level control unit can pick up containers 2 from the conveying means and release same into the throughput channels 3. A throughput channel is formed from two or more roller strips 19 and limited by separating webs 12.

The level control unit 6 is equipped with sensors 11, which makes it possible to recognize whether a throughput channel 3 can still take up a container 2 or the throughput channel is full. This can be performed with a sensor 11, which is able to measure the distance from the next obstacle (e.g., optically or with ultrasound). However, a reflector may also be arranged per ramp, and a photoelectric cell checks whether the path to the reflector is clear. If the photoelectric cell sees the reflector, the channel is clear.

Sensor 11 may also be used to check that a container 2 was released correctly into the throughput channel 3.

In case of containers 2 of different widths and throughput channels adapted to the width, the container 2 must be aligned at a defined edge. This is the front railing 20 of the level control unit 6 in this case. The alignment at the railing can be brought about by the container being taken over already in the aligned position from the conveying mechanism in another embodiment variant. However, provisions are primarily made for designing the railing 20 as a displaceable railing in order to obtain the desired alignment. Simultaneous measurement of the product width is also possible with the displaceable railing. Deviations between the channel width and the product width, could consequently be recognized.

The elevator may be equipped with different elevator platforms. The platform has a single depth in the simplest variant, i.e., only one container 2 can be carried per trip. It is possible, in principle, to also build platforms with double or multiple depths in order to make it possible to transport a plurality of containers per trip. Depending on the arrangement of the conveyor mechanism, the elevator may operate as a so-called C conveyor or S conveyor. "C" means that the container describes a "C," i.e., the container enters in one direction and leaves in the other direction. In an "S," the container moves away from the elevator in the same direction.

Thus, in a process for manually commissioning individually packaged products in a commissioning unit with a flow shelf 1 as a reserve for manual commissioning, the individually packaged products are transported according to the present invention automatically in containers 2 on a driven conveying section 4 to the flow shelf 1 preferably such that they are all of the same kind, and after reading and recognition, they are automatically introduced via an activated stationary elevator 5 and activated level control units of the flow shelf 1 into the selected throughput channels 3 of the flow shelf with outlets A that can be reached by a commissioning person 17 by hand. Individually packaged products are fed by the commissioning person 17 to an order container 30 made available according to an order document, from a container 2 at a selected outlet A of a flow shelf 3.

The order container 30 charged with individually packaged products of a commissioning order may be fed to another commissioning workplace of the said flow shelf 1.

In case of absence of an individually packaged product to be commissioned in the flow shelf 1, the order container 30 charged with individually packaged product is fed to at least one more flow shelf, which contains the individually packaged product to be commissioned.

A completely commissioned order container 30 is fed to a shipping station.

In particular, the individually packaged products of a commissioning workplace are introduced in the first variant of the present invention by the commissioning person 17 directly into an order container 30 made available, and the order container is subsequently transported to another commissioning workplace of the same flow shelf 1 on the bay front conveying section 31 for another manual commissioning. In the absence of more individually packaged products to be commissioned in the flow shelf 1, the order container is pushed by the commissioning person 17 under the flow shelf onto a pulling-off conveying mechanism 32, which conveys the order container to another flow shelf for another manual commissioning of individually packaged products or transports same after conclusion of the commissioning order to the shipping station.

By contrast, in the second variant of the present invention, the individually packaged products are introduced by the commissioning person 17 into selected buffer trays 33 of the flow shelf 1, and the buffered individually packaged products of one commissioning order are then thrown onto the central belt 32 under the flow shelf by opening the buffer trays. The buffered individually packaged products are then fed on the central belt 32 to an order container 30, which is conveyed to another flow shelf for another manual commissioning, or is transported to the shipping station after conclusion of the commissioning order.

A completely emptied container at outlet A of a throughput channel may be used as an order container 30.

In the first alternative of the present invention according to FIGS. 1 and 2, a parallel, directly adjacent bay front conveying section 31, on which order containers 30 can be moved or conveyed manually along at least one commissioning workplace for filling with commissioned individually packaged products and positioned at a desired site for manual commissioning, is arranged at the same level especially upstream of the pulling-off conveyor mechanism 32 located near the floor under the first bay level I located close to the floor in the area of the commissioning front of the flow shelf at the outlets A of the throughput channels. The order containers 30 can then be manually transferred, especially displaced, from the bay front conveying section 31 onto the pulling-off conveyor mechanism 32 and vice versa.

In particular, the order containers are removed automatically into a station (bay area of a commissioning person) or to a commissioning workplace. Only the pushing over of the finished order containers is carried out manually. The conveyor mechanism directly in front of the commissioning person is also preferably not driven, so that a commissioning person can also push along the order container currently being processed by himself.

Figure 3:
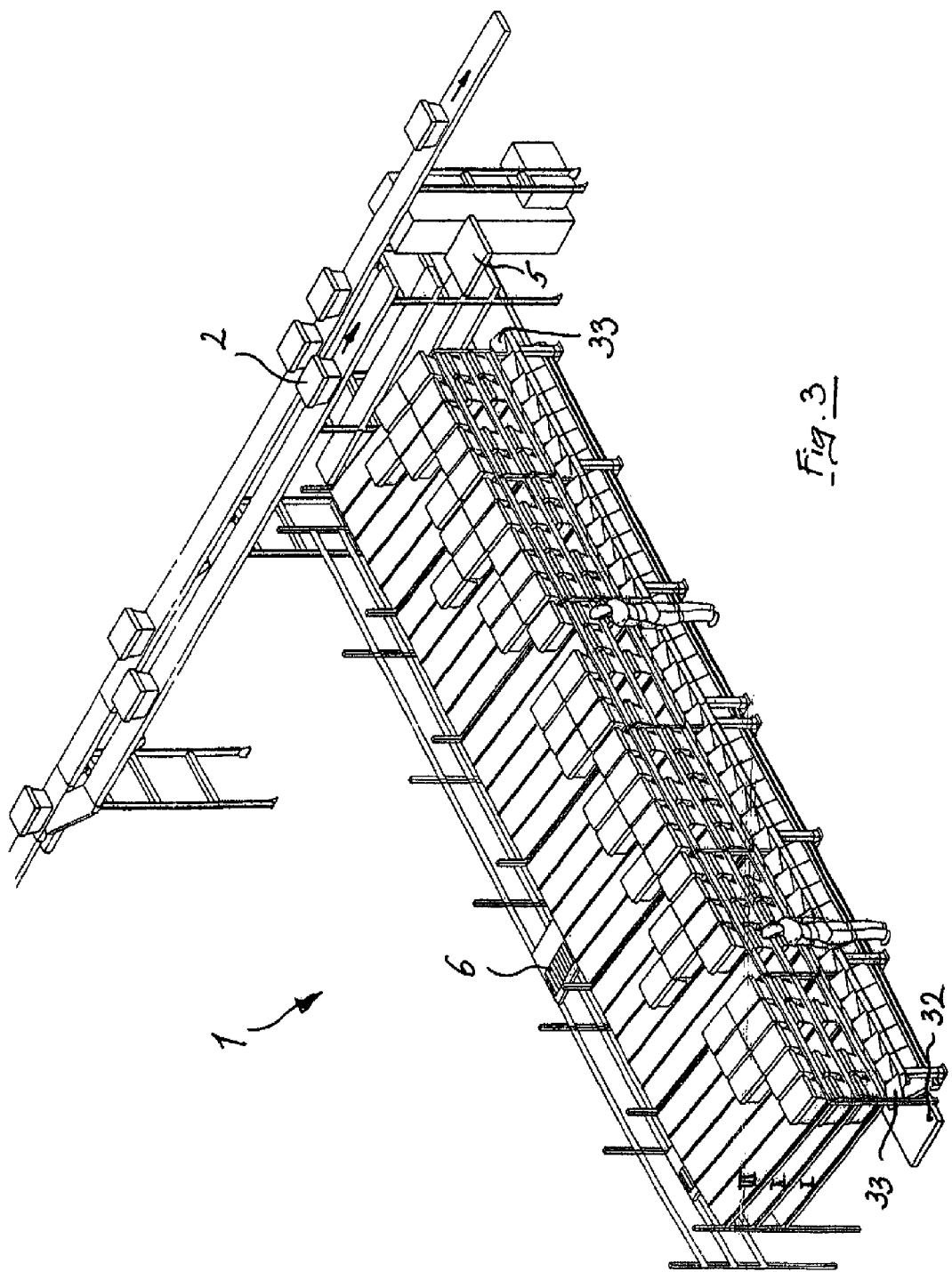
FIG. 3 is a flow shelf of a commissioning unit along with container conveying sections and central belt with buffer trays according to a second variant of the present invention in a schematic perspective view as viewed from the rear.
Figure 4:
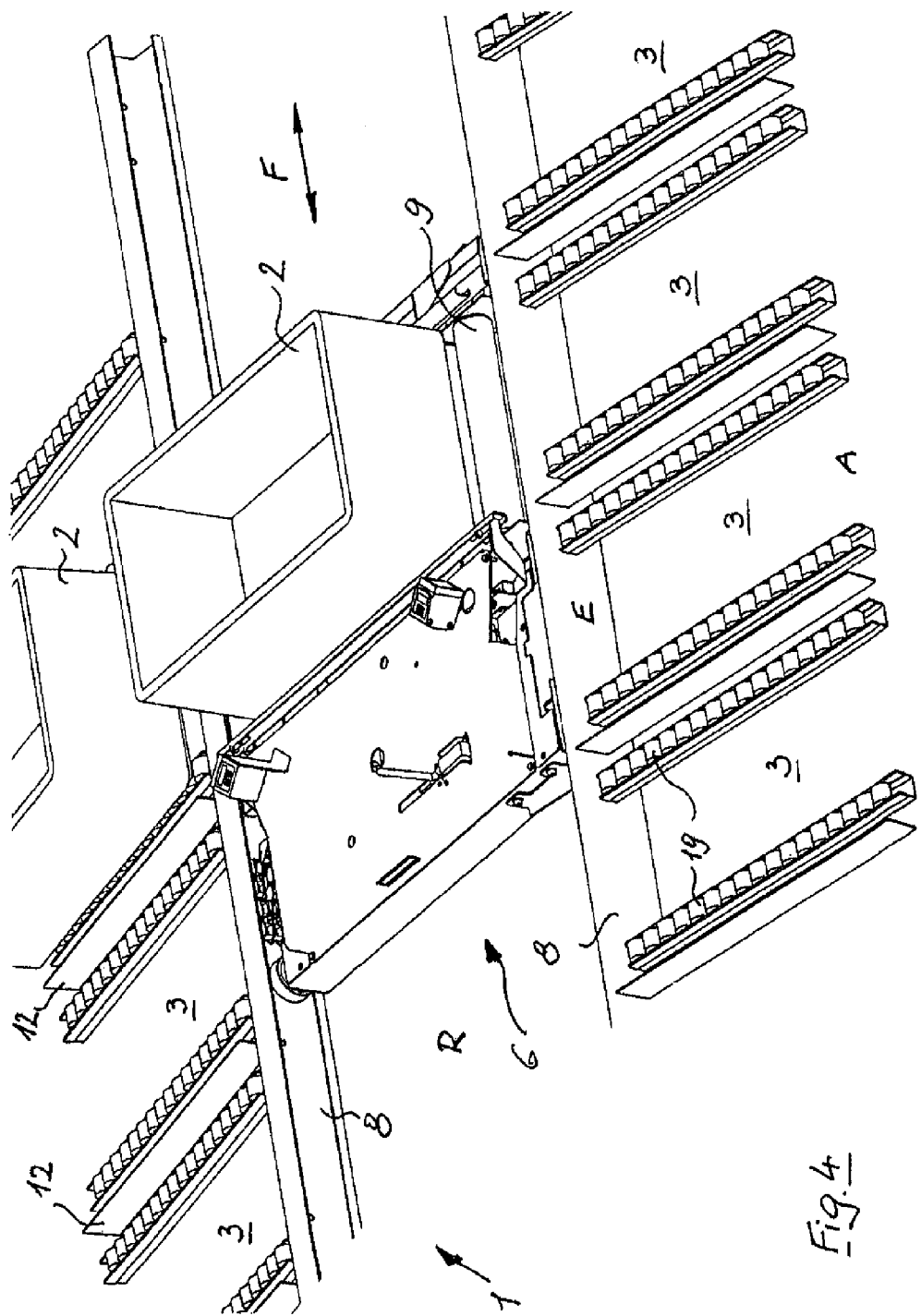
FIG. 4 is detail view of a bay plane of a flow shelf with a level control unit.
Figure 5:
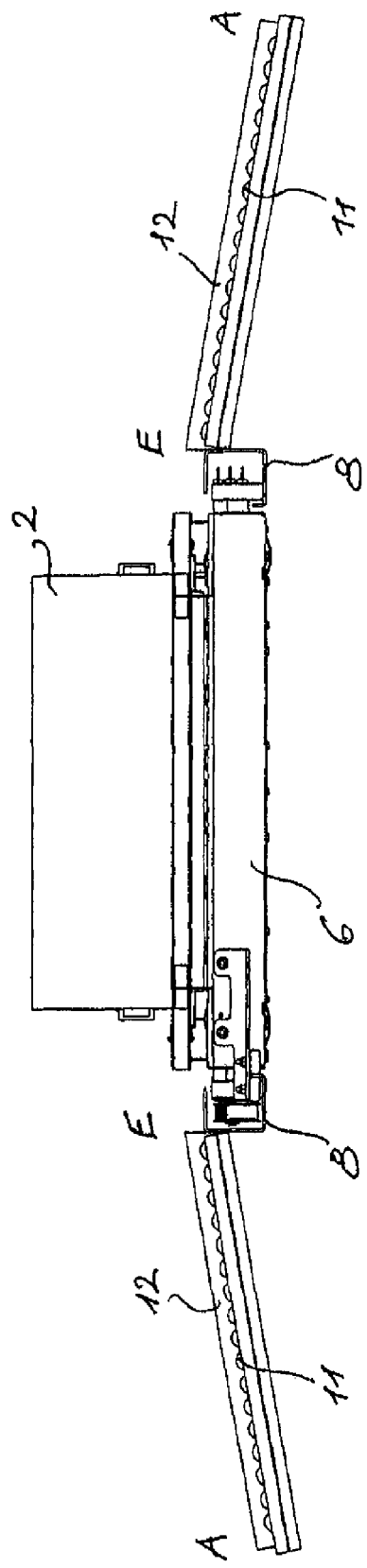
FIG. 5 is a schematic view of the bay plane according to FIG. 4 from the front with a container omitted.

In the second alternative of the present invention according to FIG. 3, the flow shelf 1, in particular, has, in the area of the outlets A of the throughput channels, buffer trays 33 for commissioned individually packaged products. The buffer trays 33 have openable bottoms located over the central belt and whose preferably oblique inlet is open at the top and can be easily reached by a commissioning person 17.

A buffer tray 33 is preferably arranged along the commissioning front of the flow shelf 1 under each outlet A of the throughput channels of the first bay level I located near the floor. During commissioning in order containers, the order container is removed to a station, i.e., into a bay area of the flow shelf. The products are taken from the source positions and introduced into the order container. The commissioning person may be guided in various manners. The commissioning person may operate classically according to commissioning lists, or be guided by "pick-to-light" or "voicepicking.". Once all products of this station have been introduced into the order container, the commissioning person pushes the order container onto the connection conveyor mechanism. It travels to the next station or leaves the area.

In case of commissioning in buffer trays, the commissioning person is guided by means of radio terminals or pick-to-light displays. User guidance by voice is conceivable as well. The user releases the products from this bay area, which belong to one order, into the corresponding buffer tray. Once all products of one order are in the buffer trays of the respective bay areas, the order is started at the central belt, and the products are thrown into the order window. The products are transferred at the front end into the order container.

While specific embodiments of the invention have been described in detail to illustrate the application of the principles of the invention, it will be understood that the invention may be embodied otherwise without departing from such principles.

The invention claimed is:
1. A process for manually commissioning individually packaged products, the process comprising the steps of:

providing a plurality of containers with a plurality of the individually packaged products packed into the plurality of containers;
providing a driven conveying section and an elevator;
transporting the plurality of containers along the driven conveying section to the elevator;
providing a plurality of channels receiving and guiding the containers, said plurality of channels being arranged in a plurality of levels to form a flow shelf, each of said levels including a plurality of said channels arranged in a horizontal direction, said each of said levels being arranged in a vertical direction, each of said plurality of channels having an inlet and an outlet;
selectively moving the elevator with one of the plurality of containers to one of said plurality of levels;
providing a plurality of level conveyor units, each of said level conveyor units being arranged at a different one of said plurality of levels of said channels;
selectively moving the containers from the elevator to one of the level conveyor units;
selectively conveying the containers from the elevator to said inlets of said channels in a respective said level on a respective level conveyor unit;
moving the containers from the inlets of the channels to the outlets of the channels;
providing a commissioning workplace at the outlets of the plurality of channels;
providing an order container at the commissioning workplace;
providing an order document indicating which desired products are to be in the order container;
moving the desired products from the containers at the outlets of the channels, to the order container, by a commissioning person.

2. A manually commissioning process in accordance with claim 1, further comprising:
providing another commissioning workplace at outlets of the plurality of channels;
moving the order container with the desired products to the another commissioning workplace.

3. A manually commissioning process in accordance with claim 1, further comprising:
providing another plurality of channels forming another flow shelf;
in an absence of a desired product in the flow shelf, moving the order container with a remainder of the desired products to the another flow shelf, which contains the desired product.

4. A manually commissioning process in accordance with claim 1, further comprising:
moving the order container filled with the desired products to a shipping station.

5. A manually commissioning process in accordance with claim 1, further comprising:
providing another commissioning workplace at the outlets of the plurality of channels;
providing a bay front conveying section for transporting the order container from the commissioning workplace to the another commissioning workplace;
providing another plurality of channels forming another flow shelf;
providing a shipping station;
providing a pulling-off of conveying mechanism for transporting the order container between the flow shelf, the another flow shelf and the shipping station;
moving the order container from the commissioning workplace to the another commissioning workplace on the bay front conveying section when the order document indicates that desire products from the another commissioning workplace are to be in the order container;
moving the order container from the flow shelf to the another flow shelf on the pulling-off conveying mechanism when the order document indicates that desire products from the another flow shelf are to be in the order container;
moving the order container from the flow shelf to the shipping station on the pulling-off conveying mechanism when all desired products are in the order container.

6. A manually commissioning process in accordance with claim 1, wherein:
said providing of the order container is performed by taking an empty one of the plurality of containers from one of the channels.

7. A manually commissioning process in accordance with claim 1, wherein:
said step of moving the desired products from the containers to the order container includes:
providing a plurality of selected buffer trays at the outlets of the channels;
moving the desired products from the containers to the selected buffer trays by the commissioning person to form a commissioning order;
providing a pulling-off conveying mechanism under the flow shelf;
opening the buffer trays to move the commissioning order to the pulling-off conveying mechanism;
moving the commissioning order from the pulling-off conveying mechanism to the order container;
conveying the order container to another flow shelf for another manual commissioning, or to a shipping station after conclusion of the commissioning order.

8. A commissioning unit with a plurality of containers, the commissioning unit comprising:
a plurality of channels arranged next to each other and one on top of another, wherein said channels being arranged next to each other form one of a plurality of levels of a flow shelf, each of said channels having an inlet and an outlet, said outlets being arranged to be reached by a human operator by hand;
a separate, rail-guided level conveyor unit is arranged at each of said plurality of levels, each said level conveyor unit being displace-able at right angles to said inlets ofrespective said channels, said each conveyor unit transporting a container to a selected said ramp and filling said selected ramp with the fed container;
a separate buffer section arranged upstream of each of said level conveyor units in each of said plurality of levels, each said buffer section having an outlet, said each level conveyor unit being positioned for taking over a container from a respective said buffer section of a respective said level;
an elevator selectively conveying a container into one of said buffer units of said plurality of levels;
a driven conveying section feeding the plurality of containers to said elevator;
a conveyor mechanism arranged under the flow shelf and pulling off commissioned individually packaged products.

9. A commissioning unit in accordance with claim 8, further comprising:
an order container;
a bay front conveying section on which the order container can be conveyed manually along a commissioning workplace for filling with the commissioned individually packaged products and on which the order container can be positioned at a desired site for manual commissioning, said bay front conveying section being arranged upstream of the conveyor mechanism located near a floor under the level located close to the floor in an area of a commissioning front of the flow shelf at the outlets of the channels, wherein the order container can be manually transferred, from the bay front conveying section onto the conveyor mechanism and vice versa.

10. A commissioning unit in accordance with claim 8, further comprising:
buffer trays in an area of the outlets of the channels for holding the commissioned individually packaged products, said buffer trays having openable bottoms located over said conveyor mechanism, the buffer trays being open at the top and easily reached by the commissioning person.

11. A commissioning unit in accordance with claim 10, wherein:
one of said buffer trays are arranged along a commissioning front of the flow shelf under each outlet of the channels of the level near the floor.

12. A commissioning unit in accordance with claim 8, wherein:
said level conveyor units are guided in horizontal braces of said flow shelf which are designed as rails.

13. A commissioning unit in accordance with claim 8, wherein:
said flow shelf has said channels arranged to be one-sided;
said level conveyor units are horizontally displace-able on said inlet side of said channels.

14. A commissioning unit in accordance with claim 8, wherein:
said channels are arranged to form a double bay with a central bay aisle;
said level conveyor units are horizontally displace-able in said central bay aisle of said double bay and can be positioned at said outlets of said buffer sections and at said inlets of opposite said channels.

15. A commissioning unit in accordance with claim 8, wherein:
said level conveyor unit has a load pickup means.

16. A commissioning unit in accordance with claim 15, wherein:
said load pickup means includes a plurality of drivable rollers, whose axes extend in a direction of travel of a respective said level conveyor unit and at right angles to said channels.

17. A commissioning unit in accordance with claim 15, wherein:
said load pickup means is formed by one of a conveyor belt, and a plurality of round or toothed belts.

18. A commissioning unit in accordance with claim 15, wherein:
said load pickup means has a stationary lateral railing at right angles to a direction of travel of said level conveyor unit.

19. A commissioning unit in accordance with claim 15, wherein:
said load pickup means has two lateral railing at right angles to a direction of travel of said level conveyor unit, a distance between said two lateral railings being selectively adjustable to correspond to a width of one of the containers, with at least one of said two railings being adjustable relative to said level conveyor unit.

20. A commissioning unit in accordance with claim 19, wherein:
said channels have different widths;
said level conveyor unit is position-able at said inlets of said channels having different widths, said distance between said two railings being selectively adjustable to a respective said width of said ramp to be serviced.

21. A commissioning unit in accordance with claim 8, wherein:
said level conveyor unit includes an electric drive, which is connected to a stationary electrical conductor rail via sliding contacts.

22. A commissioning unit in accordance with claim 20, wherein:
said electric drive has a shaft encoder measuring a distance traveled by said level conveyor unit.

23. A commissioning unit in accordance with claim 8, wherein:
said level conveyor unit includes a sensor recognizing a state of filling of said channels.

24. A commissioning unit in accordance with claim 8, wherein:
said conveying section includes recognition means for recognizing a fed container and for transmitting data of the container to a central computer, which brings about a fully automatic feeding and sorting operation of the containers into said channels.

25. A commissioning unit in accordance with claim 8, wherein:
said conveying section is arranged overhead.

26. A commissioning unit in accordance with claim 8, wherein:
said conveying section has a connection section for feeding an adjacent flow shelf.

27. A commissioning unit in accordance with claim 26, wherein:
said channels are arranged to form a plurality of flow shelves in a parallel arrangement.

28. A commissioning unit in accordance with claim 8, wherein:
said plurality of channels are arranged into a plurality of bay modules, which are located one after another and are in a direction of travel of said level conveyor units.

29. A commissioning unit in accordance with claim 8, wherein:
said channels included lateral roller strips;
separating webs are arranged between adjacent said channels of one level.

30. A commissioning unit in accordance with claim 8, wherein:
one of said channels is reserved for rejected containers.

* * * * *